US009741392B2

(12) United States Patent
Ngiam et al.

(10) Patent No.: US 9,741,392 B2
(45) Date of Patent: Aug. 22, 2017

(54) CONTENT-BASED AUDIO PLAYBACK SPEED CONTROLLER

(71) Applicant: COURSERA, INC., Mountain View, CA (US)

(72) Inventors: Jiquan Ngiam, Mountain View, CA (US); Colleen Chia-Yen Lee, Palo Alto, CA (US); Jaran Charumilind, Palo Alto, CA (US); Zhenghao Chen, Palo Alto, CA (US)

(73) Assignee: Coursera, Inc., Mountain View, CA (US)

( * ) Notice: Subject to any disclaimer, the term of this patent is extended or adjusted under 35 U.S.C. 154(b) by 49 days.

(21) Appl. No.: 14/788,299

(22) Filed: Jun. 30, 2015

(65) Prior Publication Data
US 2017/0004858 A1   Jan. 5, 2017

(51) Int. Cl.
| H04N 9/80 | (2006.01) |
| G11B 27/00 | (2006.01) |
| G11B 27/031 | (2006.01) |
| G10L 21/057 | (2013.01) |
| G10L 21/0356 | (2013.01) |
| H04N 5/783 | (2006.01) |
| H04N 9/802 | (2006.01) |
| G10L 15/26 | (2006.01) |

(52) U.S. Cl.
CPC ........ *G11B 27/005* (2013.01); *G10L 21/0356* (2013.01); *G10L 21/057* (2013.01); *G11B 27/031* (2013.01); *H04N 5/783* (2013.01); *H04N 9/802* (2013.01); *G10L 15/26* (2013.01)

(58) Field of Classification Search
CPC ............................. G11B 27/005; G11B 27/031
USPC .......................................................... 386/241
See application file for complete search history.

(56) References Cited

U.S. PATENT DOCUMENTS

2007/0223873 A1* 9/2007 Gilbert ................... H04N 5/783
386/350

* cited by examiner

*Primary Examiner* — Hung Dang
*Assistant Examiner* — Girumsew Wendmagegn
(74) *Attorney, Agent, or Firm* — Brake Hughes Bellermann LLP

(57) ABSTRACT

A method includes receiving, by a computer, a video file containing audio content and or visual content. The method further involves, based on a determination of the rates at which information is communicated by different temporal segments of the video file when played back at a default playback speed, assigning a respective target playback speed to each the different temporal segments of the video file. The video file is edited and marked in a format to be played back on a video player so that each of the different temporal segments of the video file can be played back at its respective assigned target playback speed.

20 Claims, 3 Drawing Sheets

200

210
Obtain the video files (audio and visual)

220
Identify one or more temporal fragments or segments of the video based on differences in the video content (e.g., visual and/or audio content) of the different temporal fragments or segments

230
Evaluate the video content in the different temporal fragments or segments

240
Based on the evaluation, assign a respective target playback speed for each the different temporal fragments or segments of the video

250
Replay the video on a video player by replaying each the different temporal fragments or segments of the video at their respective target playback speeds

FIG. 2

CONTENT-BASED AUDIO PLAYBACK SPEED CONTROLLER

BACKGROUND

With widespread implementation of advances in electronic communication technologies (such as network connectivity, the Internet, and online services including audio and video streaming services), the use and transmission of audio files and video files as digital media is now commonplace.

Audiovisual files are becoming ubiquitous in the curricula of many academic disciplines. An online education course or class may, for example, include educational course content packaged as lecture audiovisual files, documentary or film videos, interactive instruction videos, etc. Online education course videos include short online "how to" tutorials to longer full length college courses. The lessons in some of the college courses may average 120 minutes or more at the default video playback speeds. While a large amount of content may be available in an online education course video, a viewer may still be pressed for time to view the entire video. To save time, such a viewer may speed up the playback speed, for example, to skip over portions of the video and view only a later portion of the video. The viewer may, for example, use a "fast forward" button or other speed controller on a video or media player to quickly advance the video to the later portion. A problem with this technique is that the user may miss interesting content that he fast-forwards past. Other techniques for reducing the total video viewing time may, for example, involve simply playing the video at a faster speed (e.g. 2× a normal or default speed). Such techniques are also likely to result in loss of information and yield unsatisfactory viewing or learning experiences. Playing the video at a faster speed may, for example, result in poor quality viewing (e.g., distorted sounds, garbled or incomprehensible speech, people in highly animated modes, etc.) as not all video content is made to go too fast.

Audio files, including audiovisual files, can be recorded while a person is speaking, and then played back at a later time. The playback of the file may occur at a predetermined rate or speed. However, when the file is played back at the predetermined rate or speed, the recorded speech of the speaker may be played back at a rate that is too fast for a listener to comprehend most successfully or may be played back at a rate that is inefficiently slow for the user. The user may adjust the playback speed of the file, but this may be cumbersome, especially when the file includes speech of different speakers who speak at different rates.

SUMMARY

In a general aspect, a method includes receiving, by a computer, a video file containing audio content and or visual content. The method involves determining a plurality of rates at which information is communicated by different respective temporal segments of the video file when the video file is played back at a default playback speed. Based on such determination of the rates at which information is communicated, the method further involves assigning a respective target playback speed to each the different temporal segments of the video file, and providing the video file in a format to be played back on a video player so that the each of the different temporal segments of the video file is played back at its respective assigned target playback speed.

In an aspect of the method, determining the plurality of rates at which information is communicated includes determining a plurality of rates at which words are spoken in different respective temporal segments of the video file when the audio content of the video file is played back at a default playback speed, and providing the video file in a format such that the playback speeds of audio segments therein are controlled to render speech content of the audio segments to a listener at a substantially uniform speaking rate across the audio segments.

In a general aspect, another method includes receiving an audio file, identifying one or more temporal segments of the audio file having different types of audio content, and assigning a recommended playback speed different from a default playback speed of the audio file to each of the temporal segments based on the type of audio content therein. The method further involves marking each of the temporal segments with its assigned recommended playback speed, and saving the marked audio file in a non-transitory storage medium.

In a general aspect, a system is configured to receive an audio file having one or more temporal audio segments with disparate audio content. The system includes a server having at least one processor, and an audio fragment identifier configured to identify one or more temporal segments of the audio file having different types of audio content. The system further includes a playback speed recommendation engine and an audio files editor. The playback speed recommendation engine is configured to determine a recommended playback speed for each of the temporal segments based on the type of audio content therein. At least one of the recommended playback speeds can differ from a default playback speed of the audio file. The audio files editor is configured to mark each of the temporal segments of the audio file with its assigned recommended playback speed. The system also includes a memory to store the marked audio file.

The details of one or more implementations are set forth in the accompanying drawings and the description below. Further features of the disclosed subject matter, its nature and various advantages will be more apparent from the accompanying drawings, the following detailed description, and the claims.

BRIEF DESCRIPTION OF THE DRAWINGS

FIG. 2 is a flow chart of a process for dynamically controlling a video playback speed for an audiovisual file based on known characteristics or properties of the visual and/or audio content of various segments or fragments of the audiovisual file.

DETAILED DESCRIPTION

Systems and methods for determining recommended video playback speeds for audio files are described herein. As used herein, an "audio file" includes any file that contains audio content, including, for example, audiovisual files, videos, voicemail messages, etc. The recommended audio playback speeds may depend on the type or nature of the audio content and may vary over the length or run time of the audio file as the type or nature of the audio content changes over the run time of the file. In other words, the recommended audio playback speeds may be different for different temporal segments of the audio file depending on the audio content in the different temporal segments, in accordance with the principles of the present disclosure.

The audio file may have a total run or play time along a timeline from a start time to an end time of the file. As used herein, the term "time identification" of a temporal fragment, segment or frame of an audio file may be understood to involve specifying a beginning time and an ending time of the temporal fragment, segment or frame of the audio file relative to, for example, the start time of the file.

An example audio file may be, for example, an online education course video (e.g., a classroom lecture) presented to a student or learner (or more generally "a viewer"). The online education course video may be presented or streamed to the viewer, for example, over a network or Internet connection by an online education provider or other provider. The viewer may view the online education course video, for example, in a media or video player on a network-connected viewing device or computing device.

The example online education course video's visual content or moving visual images may include visual information of unlimited types. The visual content may, for example, include presentations of typed or handwritten textual information, graphical images, photographs, stills, movie clips, animations, live lecture demonstrations, blackboard writing, etc. Similarly, the example online education course video's audio content may include audio information of unlimited types. The audio content may include, for example, recordings of man-made or computer-generated music or sounds, nature sounds, and human speech (e.g., one or more lecturers or speakers speaking at different times during the run time of the video), etc.

Figure 1:
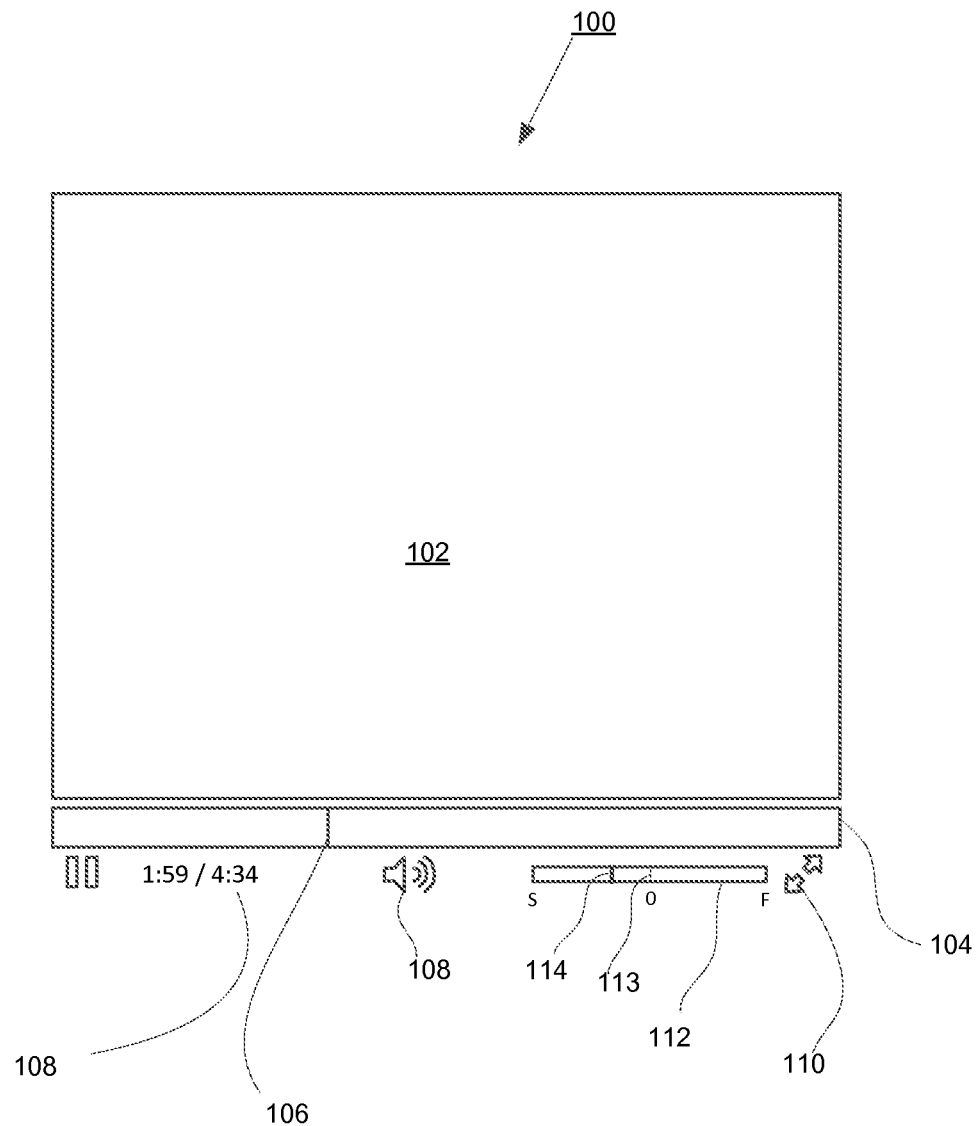
FIG. 1 is a schematic diagram of a user interface to a video player that a viewer may use to control display of a video presentation.

FIG. 1 is a schematic diagram of a user interface 100 to a video player that the viewer may use to control display of the video presentation. The user interface 100 includes video display area 102, includes one or more graphical user interface elements, for example, a visual sliding bar time indicator 104, a "pause video" checkbox or button 106, a volume control button 108, a full screen mode control button 110, etc.

A left end of sliding bar time indicator 104 can visually represent the beginning time of the video, the right end of the bar can visually represent the end time of the video, and a vertical line 112 can represent a current time of the video being played, relative to the beginning and ending times. A time stamp 114 can indicate the current time of the video that is being played and the full length (duration) of the video.

A playback speed indicator 112 can indicate the speed at which the video is played back, using either an absolute scale or a relative scale. For example the playback speed indicator 112 be presented in the form of a horizontal bar with a thin vertical line 113 located at the midpoint of the bar. A thicker vertical line 114 can be displayed on the horizontal bar, and the position of the thicker line 114 relative to the thinner line 113 can indicate the playback speed of the video relative to a default playback speed (e.g., a playback speed that is equivalent to the speed at which the video was recorded and the speed at which the video ordinarily would be played back). For example, the thicker line 114 being co-located with the thin line 113 can indicate that the actual playback speed is equal to the default playback speed. The thicker line 114 being located to the left of the thin line 113 (between the "S" (for "slower") and the "0" (for neutral) can indicate that the actual playback speed is slower than the default playback speed. The thicker line 114 being located to the right of the thin line 113 (between the "F" (for "faster") and the "0" can indicate that the actual playback speed is faster than the default playback speed.

In some implementations, the actual playback speed can be controlled automatically, without user control, and the playback speed indicator 112 can serve to display to the user the playback speed that has been automatically controlled. For example, if the actual playback speed is automatically controlled to achieve a predetermined speaking rate of speakers in the video, then the thicker line 114 may move to the left when a typically fast talker is speaking in the video and may move to the right when a typically slow talker is speaking in the video.

In some implementations, the actual playback speed can be controlled by the user, and, in some implementations, the playback speed indicator 112 can be used by the user to set the playback speed. For example, the user may be able to left click on the thicker line 114 and then drag or slide the thicker line 114 along the horizontal bar to set the playback speed, or user may be able to right click on the bar to bring up a second user interface in which the playback speed may be implicitly set through numerical input by the user. For example, the user may input a desired speaking rate in words per minute in the second user interface, and then the playback speed may be adjusted automatically, such that the speaking rate while the video is played back corresponds to the desired speaking rate.

Thus, the determined playback speed of the audiovisual file can be based on the actual audio content of the audiovisual file (e.g., the particular segment or fragment of the course video being played or displayed at a given time).

Using the systems and methods described herein, the online course provider (or another entity) may determine the recommended video playback speed based on known characteristics or properties of the visual or audio content of the various segments or fragments of the course video. The known characteristics or properties used for the determination may, for example, include characteristics such as the complexity or understandability of the content, the amount of whitespace (or conversely clutter) in text displays, the speaking rates of speakers included in the course video, etc.). The online provider or other entity determining the recommended video playback speed may have prior access to the known characteristics or properties of the visual or audio content of the various segments or fragments of the course video, for example, by themselves inspecting or analyzing the course video or obtaining a transcript of the course video (which may have been prepared, for example, by the creator of the course video, or, in another example, though a voice recognition processing of the audio file). The determination of recommended video playback speed may also include consideration of viewer capabilities, habits or preferences.

FIG. 2 shows an example method 200 for dynamically controlling a video playback speed for an audiovisual file based on known characteristics or properties of the visual and/or audio content of various segments or fragments of the audiovisual file, in accordance with the principles of the present disclosure. The video portion of the audiovisual file may, at least initially, have or be associated with a default standard playback speed (e.g., 24, 25 and 30 frames per second). In addition, the audio content of the audiovisual file, the playback of which is synchronized with the video portion of the audiovisual file, can have its own default standard playback rate, which can correspond to the sampling rate at which the audio portion of the file is recorded.

Method 200 includes obtaining the audiovisual files (e.g., digital audio and visual files) (210), identifying one or more temporal segments of the audiovisual file based on the content of the file (e.g., visual and/or audio content) in the different temporal segments (220), evaluating the audio content in the different temporal segments (230), and based on the evaluation, assigning or recommending a target playback speed for each the different temporal segments of the video (240). Method 200 may further include replaying the audiovisual file on a video player by replaying each of the different temporal segments of the video at their respective target playback speeds (250).

An example video for which method 200 may be used may be an online course video (e.g., a class room lecture). The video, as prepared by a creator, may have audio content including, for example, live speeches recorded in various segments or fragments of the video. The speeches may include speech segments made, for example, by one or more persons (e.g., speakers, lecturers, students, etc.). Each speech segment may, for example, be characterized by parameters such as a speaking or speech rate, which may vary widely with the person speaking. Studies show speech rate alters depending on the speaker's culture, geographical location, subject matter, gender, emotional state, fluency, profession or audience. For example, conversational speech generally falls between 120 words per minute (wpm) at the slow end and 150-200 wpm in the fast range. People who read books for radio or podcasts are often asked to speak at 150-160 wpm. Slide presentation speakers or other deliberate speakers may typically have a speaking rate of 100-125 wpm at a comfortable pace. Auctioneers or commentators who practice speed speech may typically have a speaking rate in the 250 to 400 wpm range, and the fastest speaking policy debaters may speak from 350 wpm to over 500 wpm.

Method 200 may be used to control the playback speed of the audiovisual file to make the audio content more comprehensible or persuasive to the viewer, for example, by slowing down replay of high speaking rate video segments or by speeding up replay of low speaking rate video segments. The playback of the video portion of the audiovisual file is adjusted to maintain a synchronization of the video portion with the adjusted playback of the audio portion. As appreciated by those of skill in the art, adjusting the playback of the audio portion of a digital audiovisual file need not be equivalent to adjusting the playback speed of an analog audio file (e.g., a phonographic record or a recording tape), which may result in a change in the pitch of the audio that is played back. Rather, with a digital audio file, various time stretching techniques can be used to change the speed of an audio signal without affecting its pitch.

In an example implementation, method 200 may be used to adjust the playback speed of the speech segments of the video so that the viewer is presented with various speech segments of the video effectively at a common or uniform target speaking rate. The common or uniform target speaking rate may be, for example, a rate that has been determined (e.g., based on human physiological studies) to be an effective rate for human hearing and comprehension. Alternatively, the common or uniform target speaking rate may be set based on viewer preference or choice.

While the terms "rate" and "speed" are mostly used in singular herein, it will be understood that these singular terms may refer to average values or a range of rates or speed. For example, in the foregoing example implementation of method 200, the common or uniform target speaking rate may refer a rate of 130 wpm, an average rate of 130 wpm, or a rate range 130±10 wpm.

In another implementation, method 200 may be used to mix and match the target speaking rates for various speech segments of the video according to the specific speech content of each speech segment and the viewers' ability to comprehend the specific speech content. The playback speed of a speech segment with a difficult or complex subject matter may be reduced or slowed down so to ensure the viewer can effectively hear the speech at a low speaking rate and has sufficient time to understand the subject matter. Conversely, the playback speed of a speech segment with a simple, light or easily understandable subject matter may be increased to reduce the time the viewer must spend viewing or listening the speech segment before moving to the next video segment. If there are several such speech segments with simple, light or easily understandable subject matter (or even a few such speech segments that are long) in the video, increasing the playback speed of such speech segments may substantially reduce the total viewing time required for viewing the video.

In another implementation, the viewer may set the speaking rate of speech in the played-back video, such that the speed of the played back video varies to maintain a speaking rate set by the user.

As used for controlling the playback speed of the video, identifying one or more temporal segments of the video based on the video content (e.g., visual and/or audio content) in the different temporal segments 220 may include time identification of a temporal fragment or frame of the course video by specifying a beginning time and an ending time of the temporal fragment or segment relative to, for example, the start time of the video. Time identification may be accomplished by using automated software recognition tools (e.g., speech or voice data analysis tools) to inspect the video or by inspection of a previously-prepared transcript of the video (which may have been prepared, for example, the video creators). For example, the playback speed of the video may be varied to maintain a desired speaking rate only during portions of the video in which speech is actually detected. During other portions of the video, the playback speed of the video can revert to a default playback speed. In another example, the playback speed of the video may be varied to maintain a desired speaking rate only during portions of the video in which a distinct speaking rate at a default playback speed of the video can be determined above a threshold level of accuracy for an extended duration. During other portions of the video, which are not associated with a distinct speaking rate or rates (e.g., when muffled, generally incomprehensible speech is detected or when the speaking rate varies or fluctuates wildly), the playback speed of the video may revert to a default playback speed.

Furthermore, evaluating the video content in the different temporal segments 230 may, for example, include determining the speaking rate (wpm) of speech content in a temporal fragment or segment of the video. This may, for example, involve transcribing the speech content to text and using voice recognition software to determine a word count of the transcribed text. The speaking rate (wpm) of speech content may be determined or estimated by dividing the word count by the duration of the temporal fragment or segment of the video, which is given by the difference between the beginning time and the ending time determined at 220. Further, evaluating the video content in the different temporal segments 230 may include, additionally or alternatively, expert evaluation of the subject matter of the video content. Assigning a target playback speed for each the different temporal segments of the video 340, when two or more of temporal segments of the video contain speech content having different speaking rates, may include increasing or decreasing the different speaking rates toward a common or uniform target speaking rate. Presenting the speech content at a common or uniform target speaking rate to a viewer when the video is played may facilitate easier comprehension or appreciation of the speech content by the viewer. The common or uniform target speaking rate may be based on consideration of human physiological capabilities (e.g., for hearing and comprehension of speech), and consideration of the viewer's capabilities for understanding of the subject matter of the speech content. The common or uniform target speaking rate may in some implementations be a viewer-selectable or viewer-adjustable parameter.

The method 200 for dynamically controlling a video playback speed or video streaming speed for a video may be implemented, for example, in any multimedia (e.g., video) delivery and display arrangement or system.

Figure 3:
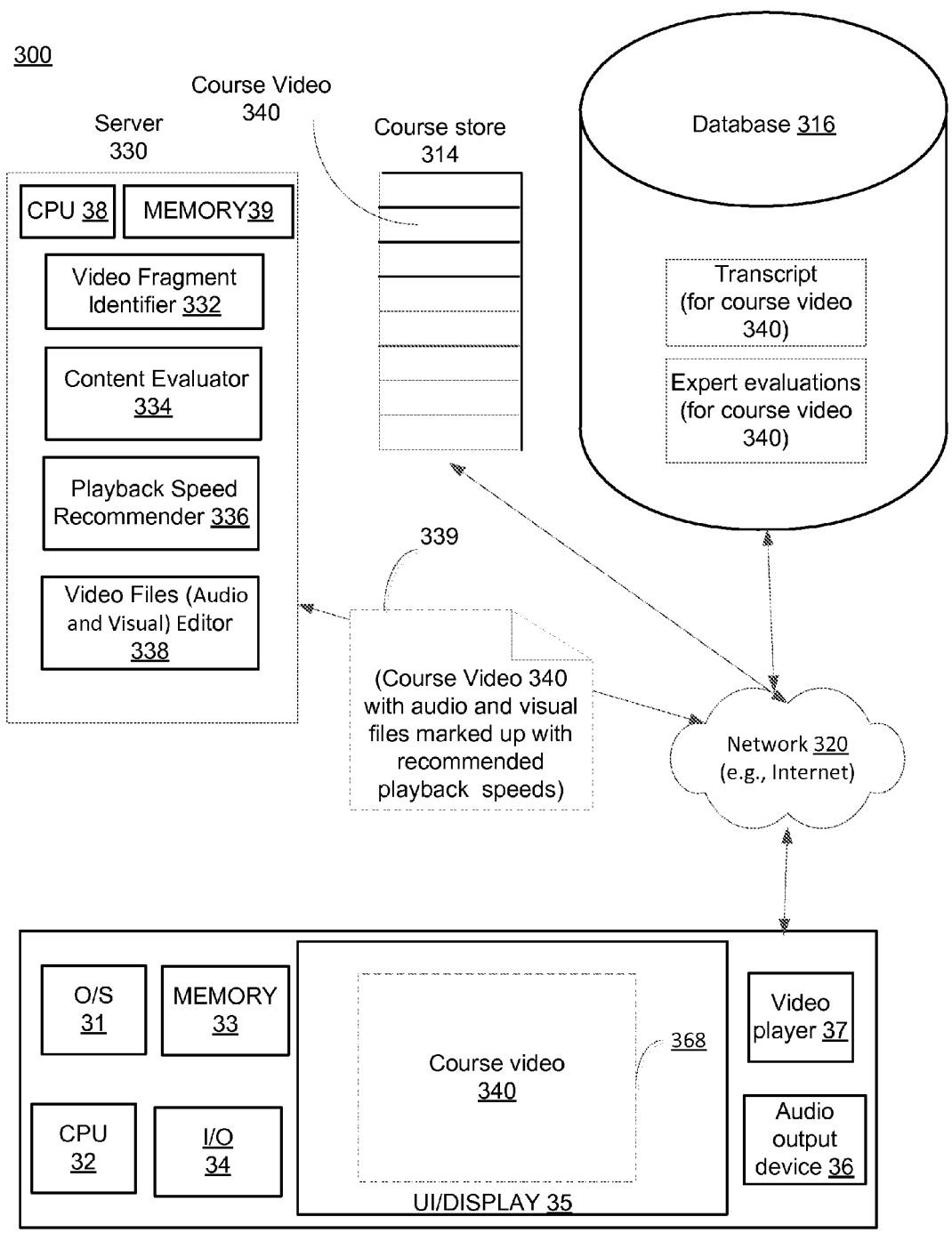
FIG. 3 is a schematic diagram of an example system that may dynamically control the video playback speed of a video.

FIG. 3 schematically shows an example system 300 that may be used in conjunction with method 200 to dynamically control the video playback speed of a video (e.g., course video 340), in accordance with the principles of the present disclosure.

System 300 may include a server (or other computing device) 330, a course store 314, and a database 316. Server 330 (which may include a processor 38 and a memory 39), course store 314, database 316 and other components of system 300 may be communicatively interlinked, for example, via a communications network 320 (e.g., the Internet). Course store 314 may include one or more user-selectable online education courses (e.g., course video 340) that a user can select for viewing. Server 330 may be configured serve, for example, the user-selected online education course (e.g., course video 340) to one or more viewers on network viewing devices (e.g., computing device 310) for viewing.

Computing device 310 may be a laptop computer, a desktop computer, a work station, a tablet, a smartphone, a server or other network viewing device. Computing device 310, which includes an O/S 31, a CPU 32, a memory 33, and I/O 34, may further include, or be coupled to, a user interface (UI) or display 35. Computing device 310 may have a capability (e.g., a video or media player 37) to run and display course video 340, for example, in a video display area 302 of display 35. Further, computing device 310 may include an audio output device 36 (e.g., speakers) coupled to video or media player 37 to play the output sounds, for example, of course video 340 being run or displayed on display 35.

Server 330 (or other computing device) may be configured receive video files (i.e. audio and visual files) of course video 340 (e.g. from course store 314). Server 330 (or the other computing device) may be configured to analyze course video 340 as obtained from course store 314 to recommend playback speeds for one or more fragments and segments of course video 340. For this purpose, server 330 may include a video fragment identifier module 332, a content evaluator tool 334, and a playback speed recommender module 336.

Video fragment identifier module 332 may be configured to temporally identify one or more fragments and segments of course video 340 (e.g., audio or speech segments) by identifying a beginning time and an ending time for each fragment or segment in the video files. Video fragment identifier module 332 may, for example, include an automatic segmentation tool for detecting and identifying the one or more segments of course video 340. Alternatively or additionally, video fragment identifier module 332 may retrieve or receive information for identification of the one or more segments of course video 340, for example, from a previously-prepared transcript of course video 340, which may be stored in database 316. In some implementations of system 300, video fragment identifier module 332 may be configured to receive user supplied time identification of the one or more segments of course video 340. The user may have obtained such time identification, for example, by manual video decomposition in an authoring environment, or by viewing an actual playback of the video and observing fragment or segment time points on the video's replay timeline or clock.

Further in server 330, content evaluator tool 334 may be configured to evaluate the content of the one or more segments identified by video fragment identifier module 332. When the one or more segments include speech content, evaluation of the content may, for example, include determining a speaking or speech rate (e.g., wpm) for the speech. Content evaluator tool 334 may include or be coupled to a speech-to-text transcription tool and a word processing tool capable of providing a text word count in the transcribed text to facilitate determination of the speaking or speech rate for the speech. Alternatively or additionally, video fragment identifier module 332 may retrieve or receive evaluations of the content of the one or more segments of course video 340, for example, from expert evaluations of course video 340, which like the previously-prepared transcript of course video 340 may be stored in database 316. The expert evaluations of the content of the segments may be based on review of the previously-prepared transcript of course video 340, inspection of lists or indices of the content of the video (which, for example, may have been supplied by the video creators) or expert observation of actual displays of course video 320, for example, in a test environment.

Content evaluator tool 334 may be configured to identify segments of course video 340 delivery of which at a faster or a slower video playback speed may be beneficial for more effectively communicating the video content to a viewer (e.g., by making speaking rates more uniform through out the video display, by reducing the total time required for viewing the video, giving the viewer more time to absorb or understand difficult or complex content, etc.).

Further, playback speed recommender module 336 in server 330 may be configured to determine recommended or target playback speeds for the segments of course video 340. Playback speed recommender module 336 may include a schedule of recommended or target playback speeds for different content types (e.g., free speech, debates, slideshow presentation, blackboard writing, cluttered text display, speech with speaking rates greater than a threshold speaking rate, etc.). Playback speed recommender module 336 may determine the recommended or target playback speed for each fragment or segment of course video 340 based on this schedule in conjunction with the results of content evaluator tool 334. In some implementations of system 300, the schedule of recommended or target playback speeds for different content types may be supplemented or superseded by viewer preferences or choices (e.g., for a speaking rate in a sound segment). The viewer preferences or choices may, for example, be received via computing device 310 over network 320 before or even during actual playback of course video 340 on video player 37/computing device 310. In some instances, the viewer preferences or choices received during playback of course video 340 may be used to dynamically modify further playback of course video 340.

Server 330 may further include a video files editor 338 for editing the audio and visual files of course video 340. Video files editor 330 may be configured to mark or associate each fragment or segment in the video files of course video 340 with the recommended or target playback speed determined for that fragment or segment by playback speed recommender module 336. Video files editor 330 may be configured to confirm that that each temporal fragment or segment in the video files is marked with a begin time and an end time (or an in-point and an out-point in video editing terms). If a temporal fragment or segment in the video files is not properly marked, video files editor 338 may insert the beginning time and the ending time found by video fragment identifier module 332 to clearly delimit the temporal fragment or segment. The temporal fragment or segment time identification in the video files may used as cue points by a viewing device (e.g., video player 27) for switching or transitioning video replay speeds to the recommended or target playback speeds when transitioning from one fragment or segment to another.

Server 330/video files editor 338 may export the edited video files (e.g., video files 339) as a modified version of course video 340. Video files 339 may include the as-obtained video files of course video 340 in which temporal segments of different content are further marked up or associated with the recommended or target playback speeds (e.g., the recommended or target playback speeds determined by playback speed recommender module 336). Video files 339 may be exported to a database (e.g., database 316) for storage or directly to one or more viewing devices.

For example, server 330 may serve, stream or otherwise deliver video files 339 to computing device 310 for playback on video player 37. Video player 37 may play or run video file 339 speeding up or slowing down playback of the temporal segments therein to the associated recommended or target playback speeds. In this manner system 300 may be used to implement, for example, method 200 for making the audio content of course video 310 more comprehensible or persuasive to the viewer (e.g., by slowing down high speaking rate video segments or speeding up low speaking rate video segments so that the viewer hears various speech segments of the video at a common or uniform target speaking rate).

In accordance with the principles of the present disclosure, software (i.e. instructions) for implementing the aforementioned systems (e.g., system 300) can be provided on computer-readable media. It will be appreciated that each of the methods (e.g., method 200) described above, and any combination thereof, can be implemented by computer program instructions. These computer program instructions can be loaded onto a computer or other programmable apparatus to produce a machine, such that the instructions, which execute on the computer or other programmable apparatus, create means for implementing the functions of the aforementioned systems and methods. These computer program instructions can also be stored in a computer-readable memory that can direct a computer or other programmable apparatus to function in a particular manner, such that the instructions stored in the computer-readable memory produce an article of manufacture including instruction means which implement the functions of the aforementioned systems and methods. The computer program instructions can also be loaded onto a computer or other programmable apparatus to cause a series of operational steps to be performed on the computer or other programmable apparatus to produce a computer implemented process such that the instructions which execute on the computer or other programmable apparatus provide steps for implementing the functions of the aforementioned systems and methods. It will also be understood that the computer-readable media on which instructions for implementing the aforementioned systems and methods are be provided, include without limitation, firmware, microcontrollers, microprocessors, integrated circuits, ASICS, and other available non-transitory media.

It will be noted that the present disclosure is not described with reference to any particular programming language. It will be appreciated that any of a variety of available programming languages may be used to implement the teachings of the disclosure as described herein.

It will be understood that the foregoing description is only illustrative of the principles of the disclosure herein, and that various modifications, substitutions, changes and equivalents can be made by those skilled in the art without departing from the scope and spirit of the present disclosure. For example, in addition to controlling the playback speed of audiovisual content to maintain a desired speaking rate of the spoken content in the audiovisual file, the techniques described herein can be used to control the playback speed of a file with audio-only content (e.g., a voicemail message) to maintain a desired speaking rate of the spoken content in the audio file. Furthermore, the techniques describe herein can be applied on a local computing device, in addition to on a service computer. For example, a smartphone, tablet, laptop, etc. can apply the techniques describe here.

It will, therefore, be also understood that the appended claims are intended to cover all such modifications, substitutions, changes and equivalents as fall within the scope of the present disclosure.

What is claimed is:

1. A method comprising:
   receiving, by a computer, a video file containing audio content or visual content the visual content including different types of visual information in different temporal segments of the video file:
   determining a plurality of rates at which visual information is communicated by the different temporal segments of the video file when the video file is played back at a default playback speed;
   based on the determination of the plurality of rates at which visual information is communicated and the characteristics of the visual information in the different temporal segments of the video file, assigning a respective target playback speed to each the different temporal segments of the video file; and
   providing the video file in a format to be played back on a video player, such that the each of the different temporal segments of the video file is played back at its respective assigned target playback speed.

2. The method of claim 1, wherein determining the plurality of rates at which information is communicated includes determining a plurality of rates at which words are spoken in different respective temporal segments of the video file when the audio content of the video file is played back at a default playback speed.

3. The method of claim 1, further comprising identifying the different temporal segments based on different respective speaking rates in the different temporal segments.

4. The method of claim 1, wherein providing the video file includes providing the file in a format such that an audio segment having a speaking rate of greater than 170 words per minute is played back at a slowed down speed compared to the default playback speed.

5. The method of claim 1, wherein providing the video file includes providing the file in a format such that an audio segment having a speaking rate of less than 130 words per minute is played back at a sped-up speed compared to the default playback speed.

6. The method of claim 1, wherein providing the video file includes providing the file in a format such that the playback speeds of the temporal segments are controlled to render speech content of the temporal segments to a listener at a substantially uniform speaking rate across the temporal segments.

7. The method of claim 6, further comprising:
receiving a viewer-specified speaking rate; and
setting the uniform speaking rate to equal the viewer-specified speaking rate.

8. The method of claim 6, wherein replaying the video file on the video player includes adjusting the playback speed of an audio segment to achieve an effective speaking rate considering the temporal segment's speech content and a listener's ability to comprehend the speech content.

9. A method comprising:
receiving an audiovisual file;
identifying one or more temporal segments of the audiovisual file having different types of visual content;
assigning a recommended playback speed to each of the temporal segments based on the type of visual content therein, wherein at least one of the recommended playback speeds differs from a default playback speed of the audiovisual file;
marking each of the temporal segments of the audiovisual file with its assigned recommended playback speed; and
saving the marked audiovisual file in a storage medium.

10. The method of claim 9, wherein identifying one or more temporal segments of the audiovisual file having different types of visual content includes determining a speaking rate of speech content in each of the one or more temporal segments.

11. The method of claim 10, wherein determining a speaking rate of speech content includes:
automatically processing the speech content to transcribe spoken words to a text document; and
automatically determining a word count of at least one temporal segment.

12. The method of claim 10, wherein identifying one or more temporal segments of the audiovisual file includes identifying a first temporal segment with speech content characterized by a first speaking rate, and wherein assigning the recommended playback speed includes assigning a first recommended playback speed to the first temporal segment to yield an effective speaking rate that is higher or lower than the first speaking rate when the first temporal segment is replayed at the first recommended playback speed.

13. The method of claim 12, wherein identifying one or more temporal segments of the audiovisual file further includes identifying a second temporal segment with speech content characterized by a second speaking rate, and wherein assigning the recommended playback speed includes assigning a second recommended playback speed to the second temporal segment to yield a substantially uniform effective speaking rate across the first temporal segment and the second temporal segment when the second temporal segment is replayed at the second recommended playback speed.

14. The method of claim 9, wherein identifying one or more temporal segments of the audio includes specifying a respective beginning time and ending time for each of the one or more temporal segments.

15. A system configured to receive an audiovisual file, the audiovisual file having one or more temporal segments with disparate visual content, the system comprising:
a server including at least one processor;
a fragment identifier configured to identify one or more temporal segments of the audiovisual file having different types of visual content;
a playback speed recommendation engine configured to determine a recommended playback speed for each of the temporal segments based on the type of visual content therein, wherein at least one of the recommended playback speeds differs from a default playback speed of the audiovisual file;
a file editor configured to mark each of the temporal segments of the audiovisual file with its assigned recommended playback speed; and
a memory configured to store the marked audiovisual file.

16. The system of claim 15, further comprising a network interface configured for exporting the marked audiovisual file to a client device having an audio player.

17. The system of claim 15, wherein the fragment identifier is configured to determine a speaking rate of speech content in each of the one or more temporal segments.

18. The system of claim 17, wherein the fragment identifier is configured to determine the speaking rate of the speech content by automatically processing the speech content to transcribe spoken words to a text document and automatically determine a word count of at least one temporal segment.

19. The system of claim 15, wherein the fragment identifier is configured to identify a first temporal segment with speech content characterized by a first speaking rate, and wherein the playback speed recommendation engine is configured to assign a first recommended playback speed to the first temporal segment to yield an effective speaking rate that is higher or lower than the first speaking rate when the first temporal segment is replayed at the first recommended playback speed.

20. The system of claim 19, wherein the fragment identifier is further configured to identify a second temporal segment with speech content characterized by a second speaking rate, and wherein the playback speed recommendation engine is further configured to assign a second recommended playback speed to the second temporal segment to yield a substantially uniform effective speaking rate across the first temporal segment and the second temporal segment when the second temporal segment is replayed at the second recommended playback speed.

* * * * *